Nov. 19, 1940.  P. GÖRLICH  2,222,292

PHOTOELECTRIC EXPOSURE METER

Original Filed Dec. 16, 1937  3 Sheets-Sheet 1

Nov. 19, 1940.   P. GÖRLICH   2,222,292
PHOTOELECTRIC EXPOSURE METER
Original Filed Dec. 16, 1937    3 Sheets-Sheet 3

INVENTOR
Paul Görlich
BY
Singer, Eckert, Stern & Carlberg
ATTORNEYS.

Patented Nov. 19, 1940

2,222,292

UNITED STATES PATENT OFFICE 2,222,292

PHOTOELECTRIC EXPOSURE METER

Paul Görlich, Dresden, Germany, assignor to Zeiss Ikon Aktiengesellschaft, Dresden, Germany Original application December 16, 1937, Serial No. 180,216. Divided and this application February 14, 1940, Serial No. 318,907. In Germany December 17, 1936

6 Claims. (Cl. 95—10)

The present invention is a division of my United States Patent application Serial No. 180,216, filed on the 16th day of December 1937 and relates to improvements in photoelectric exposure meters, in particular in combination with photographic cameras.

In photoelectric exposure meters heretofore used a photoelectric cell when energized by light produces an electric current which is measured by a measuring instrument. The size of the deflection of the pointer of the measuring instrument under due consideration of the selected diaphragm opening of the photographic lens and the sensitiveness of the photographic emulsion indicates the required exposure time or shutter speed for obtaining a correct exposure of the photographic emulsion under the prevailing light conditions. Exposure meters of this well known type, however do not operate very accurate within the range of low light intensities due to poor light conditions and sometimes fail completely which, of course, is a disadvantage.

It is the object of the invention to provide a photoelectric exposure meter which does not have this disadvantage. This object is accomplished by employing an entirely different operating principle than heretofore employed in photoelectric exposure meters. In accordance with the present invention the novel method of measuring the brightness of the scene to be photographed consists in this, that the photoelectric current produced in the photoelectric cell when the latter is energized by light, is utilized to charge a condenser. The charging of the condenser is continued for a predetermined period of time. If desired this charging period may be selected in accordance with the prevailing brightness of the scene or object to be photographed. Then the charged condenser is discharged into a circuit in which a measuring instrument, for instance a galvanometer, is arranged. The size of the deflection of the pointer of this measuring instrument, under due consideration of the duration of the charging period, indicates the brightness of the light measured and under further consideration of the sensitiveness of the photographic emulsion and the selected diaphragm aperture of the photographic lens or shutter speed respectively, is an indication of the required shutter speed or diaphragm aperture respectively to produce a correctly exposed photographic negative.

Another object of the invention is to utilize the deflection of the pointer of the measuring instrument which is actuated by the current discharged from the condenser, directly or indirectly for a corresponding adjustment of a correlated camera control element, as for instance the diaphragm adjusting member or the shutter speed adjusting member as the case may be.

Other objects of the invention will be apparent or will be pointed out more specifically in the following description with reference to the accompanying drawings disclosing by way of example a few embodiments of the invention.

Referring to the drawings.

Figure 1:
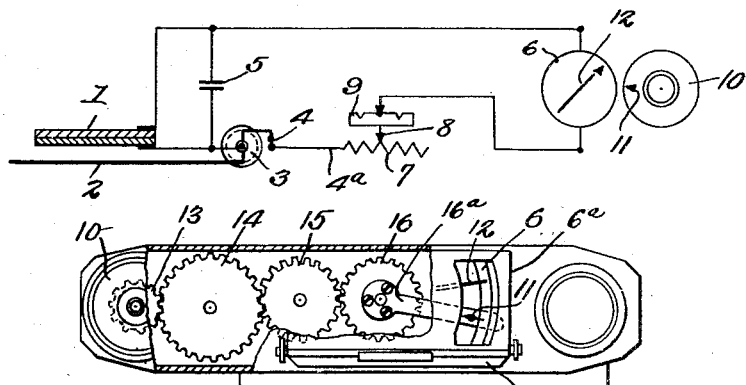
Fig. 1 shows diagrammatically a photo-electric exposure meter of the invention associated with certain exposure control elements of a photographic camera.

In the diagrammatic illustration of Fig. 1, the photoelectric cell 1 is normally protected against the light by a cover 2 adapted to be moved manually away from the front of the cell. The cover 2 may be pivotally attached to the mounting or casing of the photoelectric cell 1 by a hinge as indicated at 2ª in Fig. 3.

For determining the correct exposure time the photoelectric cell 1 has to be exposed to the light reflected from the scene or object to be photographed. For this purpose the cover 2 is manually moved into open position and hereby a spring motor 3, which is operatively connected with said cover 2, is tensioned. At the same time a switch 4 in a conductor 4ª leading to the resistance 7 and the measuring instrument 6 is opened. A condenser 5 arranged in circuit with the photoelectric cell 1 is now charged with the photo current generated in the cell. This charging operation is continued until the cover 2 is automatically closed by the previously tensioned spring motor 3 which is provided with suitable retarding means (not shown) to effect a closing of the cover 2 after a predetermined interval of time. At the instant the cover 2 is closed the switch 5 is closed again and the condenser 5 is discharged over the galvanometer 6 whose pointer 12 is deflected in accordance with the intensity of the electric current passing through the instrument 6.

Prior to operating the exposure meter in the described manner it is necessary to adjust the variable resistance 7 with respect to the film speed and the size of the diaphragm aperture of the camera lens. As indicated diagrammatically in Fig. 1 any change in the adjustment of the diaphragm aperture is compensated for by a corresponding adjustment of the slidable contact member 8 of the resistance 7. The film speed is taken into consideration by a suitable adjustment of the slidable bar 9 which is fixedly connected with the contact member 8.

After the exposure meter has been operated as described and the pointer 12 has been actuated and deflected by the current discharged from the condenser 5, the shutter speed adjusting member 10 of the camera is manually rotated until a mark 11 thereon coincides with the deflected position of the pointer 12. This rotation of member 10 adjusts the shutter automatically to the correct speed to obtain a correctly exposed negative.

Figure 2:
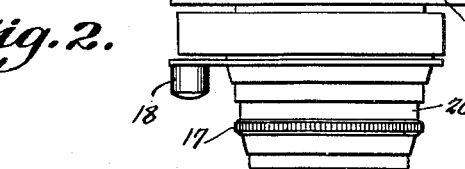
Fig. 2 shows the photographic camera in plan view, with portions broken away to disclose the interior mechanism.
Figure 3:
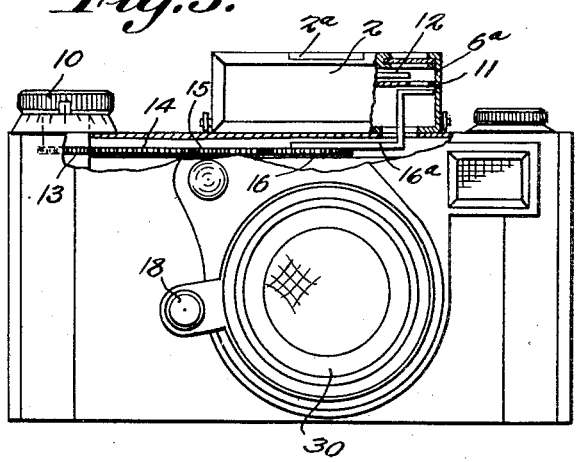
Fig. 3 is a front elevation view of the camera and its associated exposure meter, likewise with portions broken away.
Figure 4:
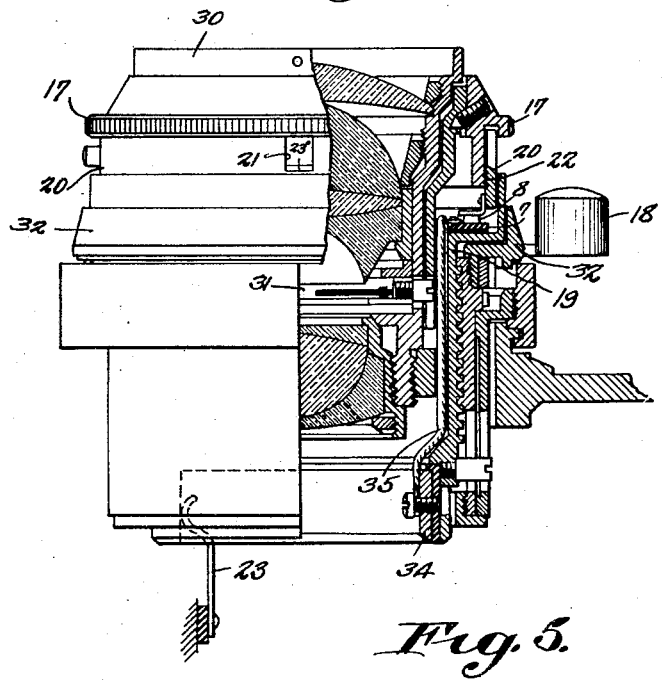
Fig. 4 shows in an enlarged scale and partly in section the photographic lens system of the camera and illustrates the mounting of the resistance belonging to the exposure meter.

The Figs. 2, 3 and 4 illustrate a practical embodiment of a camera and exposure meter operating in accordance with the diagrammatic showing of Fig. 1. The Figs. 2 and 3 disclose that the shutter speed adjusting member 10 is mounted on the top wall of the camera casing and is operatively connected by a train of gears 13, 14, 15 and 16 with a radial arm 16ª fixedly secured to the last gear 16 of said train of gears. The outer end of this arm 16ª is bent twice to extend into the casing 6ª of the measuring instrument 6 mounted together with the photoelectric cell 2 on the outside of the camera top wall. The outermost end of this arm 16ª is provided with the mark 11 and comes to lie in a plane just below the plane in which the pointer 12 of the measuring instrument 6 is deflected (Fig. 3).

The camera lens system 30 mounted on the front wall of the camera casing is provided with a knurled ring 17 (Figs. 2 and 4) for adjusting the size of the diaphragm aperture indicated at 31 (Fig. 4). The lens system 30 is focused by rotating the ring 32 provided with an actuating knob 18.

Fig. 4 illustrates all mechanical details of the adjusting devices indicated diagrammatically in Fig. 1 with 7, 8 and 9. It will be noted that the resistance 7 is mounted on a radial shoulder of the lens barrel 19. The contact member 8 which slidably engages the resistance 7 is connected by means of an intermediate ring 20 with the diaphragm adjusting ring 17. The rings 17 and 20 are rotatably adjustably connected with each other by a tight fitting thread 22 of very low pitch, but usually rotate as a unit. The intermediate ring 20 is provided with a window 21 through which a scale indicating film speeds and arranged on the diaphragm ring 17 can be observed. The adjustment for film speed is effected by rotating the rings 17 and 20 relatively to each other until the desired film speed number appears in the window 21. The insulated contact member 23 which is connected with one terminal of the galvanometer 6 slidably engages an insulated conductor ring 34 in the inner end of the lens barrel 19 and an insulated conductor 35 leads from the ring 34 to one end of the resistance 7. The other current conductor of the circuit is formed in known manner by the metallic camera casing and metallic portions of the lens mounting.

Figure 5:
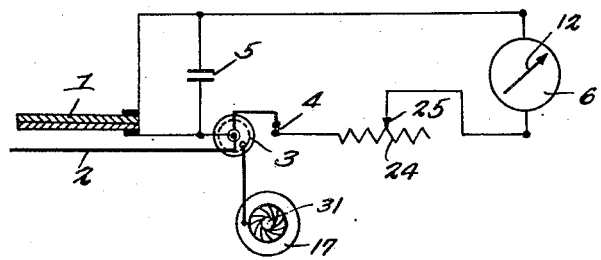
Fig. 5 shows diagrammatically a modified arrangement of the exposure meter with certain control elements of a photographic camera.

Fig. 5 illustrates diagrammatically a modification of the exposure meter arrangement of the invention. In this modification the running off period of the spring motor 3 and during which the cover 2 remains open is not constant, but is varied in accordance with the adjustment of the diaphragm apertures by means of the ring 17. Each selected diaphragm aperture 31 corresponds to a predetermined period of time during which the cover 2 remains open. In other respects, however, the modification of Fig. 5 may be the same as the first described embodiment. The shutter speed adjustment may be accomplished also by rotating the shutter speed adjusting member 10 until the mark 11 on the lever 16ª coincides with the pointer 12 as deflected by the current discharged from the condenser 5.

Figure 7:
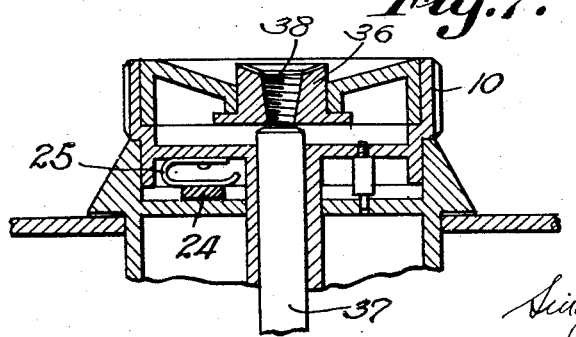
Fig. 7 illustrates the arrangement of the resistance of the exposure meter in combination with the shutter speed adjusting element of the camera in accordance with the modification of Fig. 5.
Figure 8:
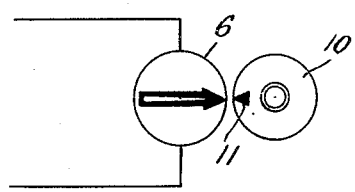
Figs. 8 and 9 illustrate diagrammatically the operation of the indicators of the measuring instrument in different positions.
Figure 9:
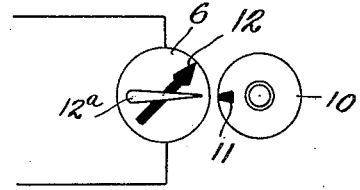
Figure 10:
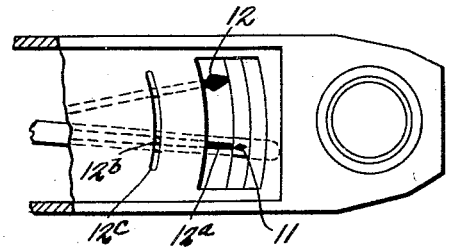
Fig. 10 is a plan view of the indicating means of the measuring instrument.
Figure 11:
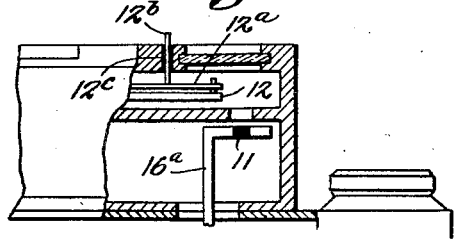
Fig. 11 is an elevation view of the indicating means, partly in vertical section.

It is, however, also possible to combine the variable resistance of the exposure meter with the shutter speed adjusting member 10 instead of with the lens system. Such an arrangement is shown in Fig. 7 and more diagrammatically in Fig. 5. The slidable contact member 25 of the resistance 24 is fixedly attached to the shutter speed adjusting member 10 and when the latter is rotated the resistance 24 is varied. The member 10 is rotatably adjusted until the pointer 12 of the galvanometer points to a predetermined mark or is returned to its zero position, as the particular case may be. In Fig. 7 the shutter speed adjusting member 10 carries in its center the customary shutter release button 36 which when depressed actuates the slidably mounted shutter release rod 37. The button 36 is provided with a threaded conical bore 38 for selectively attaching thereto a well known cable release for the shutter, if desired.

Figure 6:
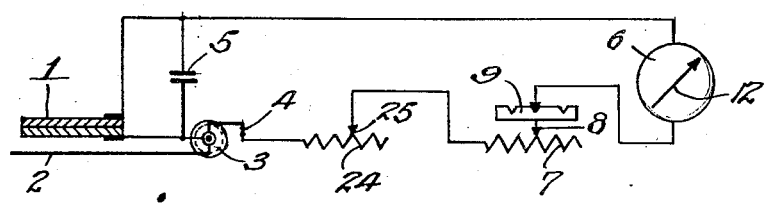
Fig. 6 shows diagrammatically a combination of the arrangements illustrated in the Figs. 1 and 5.

Referring now to Fig. 6, it will be noted that the same illustrated diagrammatically a combination of the resistance adjustments 8 and 9 correlated with the diaphragm adjustment and film speed adjustment of Figs. 1 to 4 and the shutter speed adjustment of Figs. 5 and 6 according to which the resistance 24 coupled with the shutter speed adjusting member 10 is varied by the member 10 until the pointer 12 of the measuring instrument 6 comes to rest opposite a fixed mark or is returned to its zero position. In this last embodiment there will appear two variable resistances 7 and 24 in the circuit of the exposure meter, but the train of gears 13 to 16 and the radial indicating arm 16ª are eliminated.

The measuring instrument 6 is preferably a ballistic galvanometer, so that the pointer may remain as long in its deflected position as necessary for an exact reading of the scale. Referring now to the Figs. 8 to 11 with respect to the operation of the measuring instrument, the mark 11 is set in the position indicated by the pointer 12. I also provide another performance of this construction by the use of an auxiliary pointer 12ª, which is taken along by the pointer 12 to its momentary maximal deflection. Then the pointer 12 returns to its zero position, while the auxiliary pointer 12ª remains in the above mentioned maximal position, thus making possible to read the position of the pointer even after a longer time. The mark 11 is then brought to coincidence with the auxiliary pointer 12ª. The latter is provided with a short pin 12ᵇ extending through the slot 12ᶜ. By moving this pin 12ᵇ to the left the latter may be brought in its zero position or in any other position, hereby making it possible to set the exposure time, if a mark 11 is not provided.

What I claim is:

1. The combination with a photographic camera including a casing, a photographic lens system having a variable diaphragm and a diaphragm adjusting member, of a photoelectric exposure meter, comprising a photoelectric cell mounted on said casing and provided with a cover normally protecting the cell against light, a condenser conductively connected with said cell and adapted to be charged by the photo cell current produced in said cell, a measuring instrument, conductor means including a switch and a variable resistance in a circuit with said condenser, and a spring motor connected with said cover and tensioned by the same when the cover is moved to open position, said spring motor closing said cover automatically after a predetermined period of time, said switch being operatively connected with said cover so as to be opened when said cover is opened and being closed again at the instant the spring motor has closed said cover, said resistance being mounted on said photographic lens system and being varied by said diaphragm adjusting member whenever the aperture of the diaphragm is varied.

2. The combination with a photographic camera including a casing, a shutter speed adjusting member on said casing, a photographic lens system having a variable diaphragm and a diaphragm adjusting member, of a photoelectric exposure meter comprising a photoelectric cell mounted on said casing and provided with a cover normally protecting the cell against light, a condenser conductively connected with said cell and adapted to be charged by the photo cell current produced in said cell, a measuring instrument, conductor means including a switch and a variable resistance in a circuit with said condenser, a spring motor connected with said cover and tensioned by the same when the cover is moved to open position, said spring motor closing said cover automatically after a predetermined period of time, said switch being operatively connected with said cover so as to be opened when said cover is opened and being closed again at the instant the spring motor has closed said cover, said resistance being mounted on said photographic lens system and being varied by said diaphragm adjusting member whenever the aperture of the diaphragm is varied, and means operatively connected with said shutter speed adjusting member and adjusted simultaneously with the latter for setting the speed of the shutter in accordance with the indication of said measuring instrument.

3. The combination with a photographic camera including a casing, a shutter speed adjusting member on said casing, a photographic lens system having a variable diaphragm and a diaphragm adjusting member, of a photoelectric exposure meter comprising a photoelectric cell mounted on said casing and provided with a cover normally protecting the cell against light, a condenser conductively connected with said cell and adapted to be charged by the photo cell current produced in said cell, a measuring instrument, conductor means including a switch and a variable resistance in a circuit with said condenser, a spring motor connected with said cover and tensioned by the same when the cover is moved to open position, said spring motor closing said cover automatically after a predetermined period of time, said switch being operatively connected with said cover so as to be opened when said cover is opened and being closed again at the instant the spring motor has closed said cover, said resistance being mounted on said photographic lens system and being varied by said diaphragm adjusting member whenever the aperture of the diaphragm is varied, and another variable resistance in the circuit in which said measuring instrument is arranged, said last named resistance being varied by said shutter speed adjusting member until said measuring instrument has been adjusted to a predetermined value which indicates that the shutter speed has been correctly adjusted for the prevailing light conditions and diaphragm aperture.

4. The combination with a photographic camera including a casing, a photographic lens system having a variable diaphragm and a diaphragm adjusting member, of a photoelectric exposure meter comprising a photoelectric cell mounted on said casing and provided with a cover normally protecting the cell against light, a condenser conductively connected with said cell current produced in said cell, a measuring instrument, conductor means including a switch and a variable resistance in a circuit with said condenser, and a spring motor connected with said cover and tensioned by the same when the cover is moved to open position, said spring motor closing said cover automatically after a predetermined period of time, said switch being operatively connected with said cover so as to be opened when said cover is opened and being closed again at the instant the spring motor has closed said cover, said resistance being mounted on said photographic lens system and being varied by said diaphragm adjusting member whenever the aperture of the diaphragm is varied, and means associated with said diaphragm adjusting member for adjusting said resistance for different film speeds.

5. The combination with a photographic camera including a casing, a shutter speed adjusting member on said casing, a photographic lens system having a variable diaphragm and a diaphragm adjusting member, of a photoelectric exposure meter comprising a photoelectric cell mounted on said casing and provided with a cover normally protecting the cell against light, a condenser conductively connected with said cell and adapted to be charged by the photo cell current produced in said cell, a measuring instrument, conductor means including a switch and a variable resistance in a circuit with said condenser, a spring motor connected with said cover and tensioned by the same when the cover is moved to open position, said spring motor closing said cover automatically after a predetermined period of time, said switch being operatively connected with said cover so as to be opened when said cover is opened and being closed again at the instant the spring motor has closed said cover, said resistance being mounted on said photographic lens system and being varied by said diaphragm adjusting member whenever the aperture of the diaphragm is varied, means associated with said diaphragm adjusting member for adjusting said resistance for different film speeds, and means operatively connected with said shutter speed adjusting member and adjusted simultaneously with the latter for setting the speed of the shutter in accordance with the indication of said measuring instrument.

6. The combination with a photographic camera including a casing, a shutter speed adjusting member on said casing, a photographic lens system having a variable diaphragm and a diaphragm adjusting member, of a photoelectric exposure meter comprising a photoelectric cell, mounted on said casing and provided with a cover normally protecting the cell against light, a condenser conductively connected with said cell and adapted to be charged by the photo cell current produced in said cell, a measuring instrument, conductor means including a switch and a variable resistance in a circuit with said condenser, a spring motor connected with said cover and tensioned by the same when the cover is moved to open position, said spring motor closing said cover automatically after a predetermined period of time, said switch being operatively connected with said cover so as to be opened when said cover is opened and being closed again at the instant the spring motor has closed said cover, said resistance being mounted on said photographic lens system and being varied by said diaphragm adjusting member whenever the aperture of the diaphragm is varied, means associated with said diaphragm adjusting member for adjusting said resistance for different film speeds, and another variable resistance in the circuit in which said measuring instrument is arranged, said last named resistance being varied by said shutter speed adjusting member until said measuring instrument has been adjusted to a predetermined value which indicates that the shutter speed has been correctly adjusted for the prevailing light conditions and diaphragm aperture.

PAUL GÖRLICH.